US009590802B2

(12) United States Patent
Torimoto et al.

(10) Patent No.: US 9,590,802 B2
(45) Date of Patent: Mar. 7, 2017

(54) NAVIGATION SIGNAL TRANSMITTER AND METHOD FOR GENERATING NAVIGATION SIGNAL

(75) Inventors: Hideyuki Torimoto, Tokyo (JP); Makoto Ishii, Tokyo (JP); Masahiro Asako, Tokyo (JP); Hiroaki Maeda, Kanagawa (JP)

(73) Assignees: GNSS Technologies Inc., Tokyo (JP); Lighthouse Technology & Consulting Co., Ltd., Kanagawa (JP)

( * ) Notice: Subject to any disclaimer, the term of this patent is extended or adjusted under 35 U.S.C. 154(b) by 691 days.

(21) Appl. No.: 14/009,338

(22) PCT Filed: Apr. 26, 2011

(86) PCT No.: PCT/JP2011/060136
§ 371 (c)(1),
(2), (4) Date: Oct. 2, 2013

(87) PCT Pub. No.: WO2012/147156
PCT Pub. Date: Nov. 1, 2012

(65) Prior Publication Data
US 2014/0016722 A1 Jan. 16, 2014

(51) Int. Cl.
*G01S 1/08* (2006.01)
*G01S 13/00* (2006.01)
(Continued)

(52) U.S. Cl.
CPC .............. *H04L 7/0091* (2013.01); *G01S 1/20* (2013.01); *G01S 5/021* (2013.01); *G01S 5/0226* (2013.01); *G01S 19/10* (2013.01); *G01S 19/11* (2013.01)

(58) Field of Classification Search
USPC ... 342/82, 357.4, 357.77, 386; 375/146, 295
See application file for complete search history.

(56) References Cited

U.S. PATENT DOCUMENTS 4,791,386 A 12/1988 Shiga
6,816,111 B2 11/2004 Krasner
(Continued)

FOREIGN PATENT DOCUMENTS

JP S6315530 A 1/1988
JP 09-191249 A 7/1997
(Continued)

OTHER PUBLICATIONS

Search Report issued in corresponding European Application No. 11864461.6, mailed Oct. 13, 2014 (8 pages).
(Continued)

*Primary Examiner* — Dao Phan
(74) *Attorney, Agent, or Firm* — Osha Liang LLP (57) ABSTRACT

Provided is a navigation signal transmitter capable of ensuring reduction in frequency deviation of a terrestrially transmitted navigation signal at low cost. The navigation signal transmitter is operable to receive a transmission wave, generate a synchronization pulse in synchronization with a predetermined data frame, generate an internal clock fundamental oscillation by a reference signal synchronizing section (550) using the synchronization pulse as a reference signal, generate an IMES signal based on the internal clock fundamental oscillation, and transmit the IMES signal. The reference signal synchronizing section (550) comprises a counter circuit (551), a comparator (553), a low-pass control filter (554), a D/A converter (555) and a voltage controlled oscillator (556). The reference signal synchronizing section (550) is configured to, when a magnitude relationship between the number of clock pulses generated in the voltage controlled oscillator (556) using the synchronization pulse as the reference signal and a reference value falls within a predetermined value and continues a predetermined number
(Continued)

of times in one direction, adjust a level of control voltage of the voltage controlled oscillator (556).

19 Claims, 10 Drawing Sheets

(51) Int. Cl.
*H04L 7/00* (2006.01)
*G01S 1/20* (2006.01)
*G01S 19/10* (2010.01)
*G01S 19/11* (2010.01)
*G01S 5/02* (2010.01)

(56) References Cited

U.S. PATENT DOCUMENTS

| | | | |
|---|---|---|---|
| 2004/0130484 A1 | 7/2004 | Krasner | |
| 2007/0086511 A1 | 4/2007 | Obermeyer | |
| 2007/0120585 A1 | 5/2007 | Kishibe | |
| 2009/0002230 A1 | 1/2009 | Kee et al. | |
| 2009/0115661 A1 | 5/2009 | Torimoto et al. | |
| 2010/0099434 A1 | 4/2010 | Murayama et al. | |
| 2010/0290504 A1 | 11/2010 | Torimoto et al. | |
| 2011/0050493 A1 | 3/2011 | Torimoto et al. | |

FOREIGN PATENT DOCUMENTS

| | | |
|---|---|---|
| JP | 2000115152 A | 4/2000 |
| JP | 2006-019993 A | 1/2006 |
| JP | 2006510034 A | 3/2006 |
| JP | 2007150973 A | 6/2007 |
| JP | 2007-228327 A | 9/2007 |
| JP | 2009085928 A | 4/2009 |
| JP | 2009-133731 A | 6/2009 |
| JP | 2011-095086 A | 5/2011 |
| RU | 2008/116582 A | 11/2009 |
| RU | 2008/143353 A | 5/2010 |
| WO | 2007/038552 A1 | 4/2007 |
| WO | 2008120381 A1 | 10/2008 |
| WO | 2009/044819 A1 | 4/2009 |

OTHER PUBLICATIONS

Notice of Allowance issued in corresponding Russian Application No. 2013152265 (15 pages), Dated of consideration Nov. 26, 2013.
International Search Report issued in PCT/JP2011/060136 mailed on Jun. 14, 2011 (3 pages).
Written Opinion of the International Searching Authority issued in PCT/JP2011/060136 mailed on Jun. 14, 2011 (4 pages).
Patent Abstracts of Japan for Publication No. 2009-085928, Publication Date: Apr. 23, 2009 (1 Page).
Patent Abstracts of Japan for Publication No. 2009-133731, Publication Date: Jun. 18, 2009 (1 Page).
Patent Abstracts of Japan for Publication No. 2006-019993, Publication Date: Jan. 19, 2006 (1 Page).
Patent Abstracts of Japan for Publication No. 2007-228327, Publication Date: Sep. 6, 2007 (1 Page).
Patent Abstracts of Japan for Publication No. 09-191249, Publication Date: Jul. 22, 1997 (1 Page).
Patent Abstracts of Japan for Publication No. 2011-095086, Publication Date: May 12, 2011 (1 Page).

NAVIGATION SIGNAL TRANSMITTER AND METHOD FOR GENERATING NAVIGATION SIGNAL

TECHNICAL FIELD

The present invention relates to a ground-based navigation signal transmitter for transmitting a navigation signal or a signal for positioning a receiver and a method for generating a navigation signal.

BACKGROUND ART

In satellite positioning system, a position of a receiver is determined by passively measuring positioning signals transmitted from a plurality of satellites by the receiver. In this case, time synchronization is one of key technical elements. An onboard clock is used for generation of a regular, generally sequential, series of events, called "epoch", and a clock time of occurrence of the epoch is coded to a random number code or a pseudo-random number code (hereinafter, referred to as a spreading code). Then, as a result of the pseudo-random number or random number function of a time-epoch coding sequence, an output signal spectrum is determined according to a rate of change of a spread code element and a waveform of a spreading signal. The frequency covers a wide range. Generally, the spreading waveform is of a rectangle (rectangular) and has a power spectrum represented by a sinc function.

An example of such a satellite positioning system includes a global positioning system (GPS). The GPS generally operates by using a plurality of frequency bands such as L1, L2 and L5, each having a center frequency at 1575.42 MHz, 1227.6 MHz and 1176.45 MHz, respectively. Each signal in these frequency bands is modulated by a respective spreading signal. As can be readily understood by those having ordinary skill in the art, a CA (Coarse Acquisition) signal emitted by a GPS satellite navigation system is broadcasted in the 1575.42 MHz L1 band, and has a spreading code rate (chip rate) of 1.023 MHz.

In contrast, apart from the satellite positioning systems including the GPS, there has been known an Indoor Messaging System (IMES) intended to determine position information in an indoor environment. The IMES signal, which is similar to a GPS positioning signal, is broadcasted with the same L1 frequency band of 1,575.42 MHz and has a spreading code rate (chip rate) of 1.023 MHz which is of the same family (Gold series) as a spreading code of the CA signal.

IMES transmitters for transmitting the IMES signal, which are installed in large number in buildings and underground shopping areas, transmit their position information with the IMES signals superimposing it thereon. That is, a user having an IMES receiver is capable of knowing his/her own position by receiving and demodulating the IMES signal and thereby translating the position information superimposed thereon.

In this regard, a CA code of the IMES signal is the same as a CA code of the GPS signal and repeats a series of 1,023 bits (1023 chips) on a cycle of 1 ms. Consequently, in order to switch signals without searching for a carrier frequency and a code phase, it is required for the carrier frequency to have a difference from an expected value falling within a breadth of 1 kHz that is a reciprocal number of the code cycle of 1ms and, therefore, to be certainly capable of precision within ±500 Hz. Since this represents that the clock frequency deviation is 500 Hz/1575.42 MHz=0.33E-6, it is possible to consider that the degree of precision is required to be less than 2E-6(0.2 ppm) with some margin. Further, since the code phase measures about one microsecond for one chip span, the degree of precision is required to be around ±300 ns or less.

Figure 8:
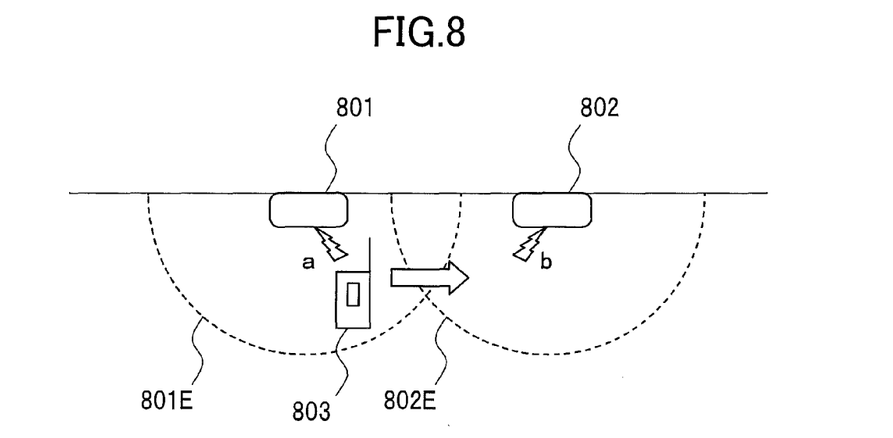
FIG. 8 is an explanatory drawing for illustrating a situation in which a user having a conventional IMES transmitter moves from a signal area for a conventional transmitter A to a signal area for a transmitter B.

FIG. 8 illustrates a situation in which a user having a conventional IMES receiver moves from a signal area for a conventional transmitter A to a signal area for a transmitter B. When a user having the IMES receiver 803 moves from a signal area (801E) of the transmitter A (801) to a signal area (802E) of the transmitter B (802), it is necessary for the IMES receiver 803 to switch a receivable signal from a signal a compliant with the transmitter 801 to a signal b compliant with the transmitter 802. In this way, in the event of switching the receivable signal from a signal a to a signal b by way of example, it is desired from the viewpoint of communication stability and user convenience that a duration of disconnection from reception of IMES signals is as short as possible.

In consequence, for making the duration of signal disconnection as short as possible, it is required for signals a and b sent from the IMES transmitters A (801) and B (802) to have small differences in carrier frequencies and spreading code phases.

At this point, in order to be capable of receiving IMES signals, the receiver internally generates a signal called a replica signal consisting of frequency and spreading code identical with those of the signal which the IMES transmitter sends out and then performs demodulation while preserving a correlation with broadcast signals. A typical positioning signal receiver is illustrated in block configuration in FIG. 9. The positioning signal receiver 900 in FIG. 9 includes an antenna 901 for receiving signals, a receiving section 902 for performing amplification processing of the received signals through the antenna 901, a reception processing including down-conversion and A/D conversion and others and conversion to a digital intermediate frequency signal (digital IF signal; IF: Intermediate Frequency), a code replica generator 904 for generating code replica signals, and multipliers 905 and 906 each of which multiplies a signal from the receiving section 902 and a signal from the code replica generator 904.

Figure 9:
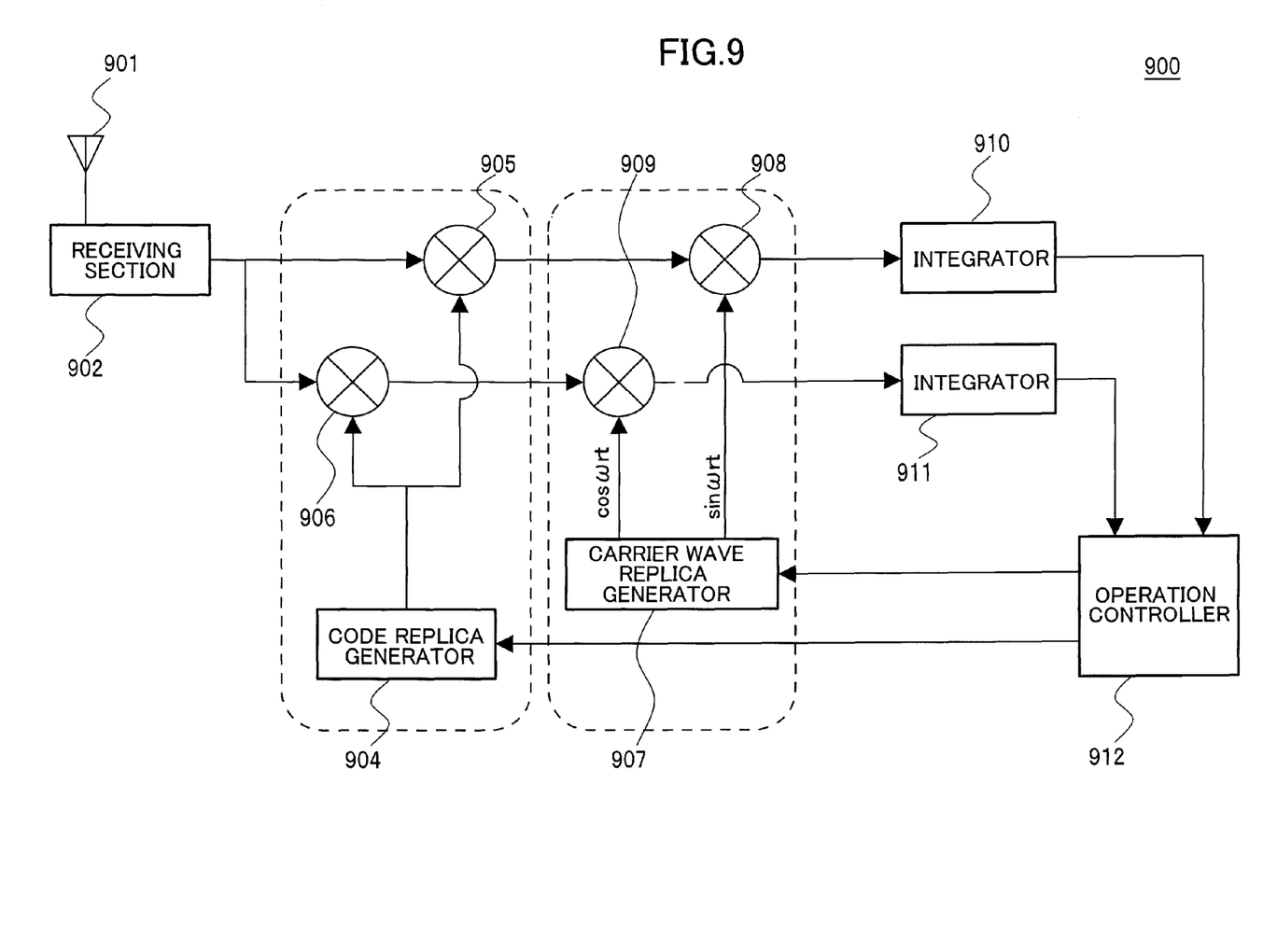
FIG. 9 is an explanatory drawing for illustrating a block configuration of a receiver circuit of a conventional positioning signal receiver.

Further, the positioning signal receiver 900 includes a carrier wave replica generator 907 for generating a carrier wave replica signal within the receiver, multipliers 908 and 909 which multiply outputs from the multipliers 905 and 906 by a sin ωrt signal and a cos ωrt signal, i.e. carrier wave replica signals, different 90 degrees in phase from each other from the code replica generator 904, respectively, and further includes an integrator 910 for integrating outputs from the multiplier 908 for a predetermined period of time, an integrator 911 for integrating outputs from the multiplier 909 for a predetermined period of time, and an operation controller 912 for performing integration of outputs from the integrators 910 and 911 (integration before squaring and integration after squared) for S/N ratio improvement in a softwarewise (or computer-programmatic) approach and further controlling the code replica generator 904 and the carrier wave replica generator 907 for signal complement and signal tracking.

At this point, the operation controller 912 is capable of modifying a code generated by the code replica generator 904 in a softwarewise (or computer-programmatic) approach. Further, the operation controller 912 extracts navigation messages based on a received satellite positioning signal and performs positioning operation et. al.

Figure 10:
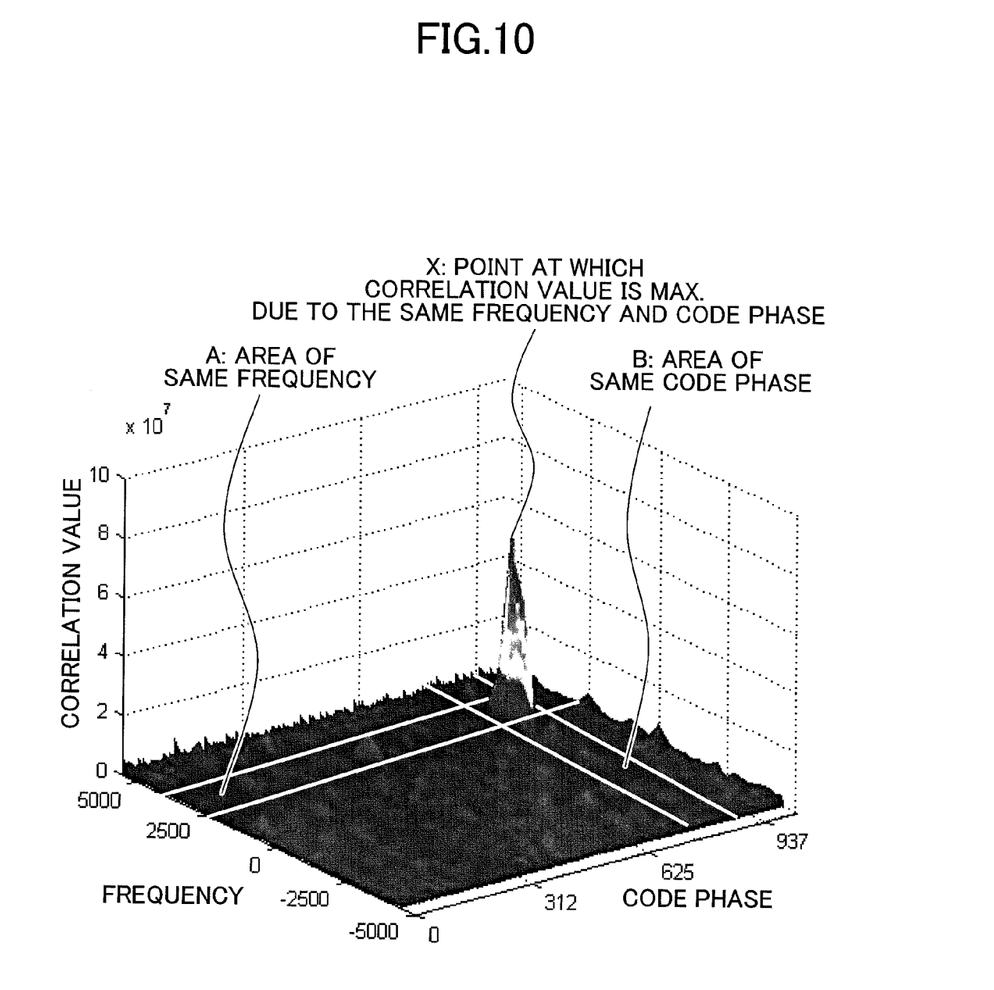
FIG. 10 is an explanatory drawing for illustrating a concept of searching for a carrier frequency and a code phase of a conventional positioning signal.

In the process of demodulation, this receiver performs a frequency search for finding frequencies of the broadcast carrier wave and the replica signal carrier wave which come to be coincided with each other (more properly, at a precision within ±500 Hz as described before) and a code phase search for finding code phases of the spreading code sent out from the INES transmitter and the spreading code of the replica signal which become to be coincided with each other. As illustrated in FIG. 10, when the replica signal and the broadcast signal come to be coincided with each other in carrier frequency and code phase, the correlation with the broadcast signal is maximized in value and then the broadcast signal can be received.

In addition, for signal switching without performing these carrier frequency search and code phase search, it was as just described above that the precision of carrier frequency is needed to be about 0.2E-6(0.2 ppm) or less and the precision of code phase is needed to be around ±300 ns or less.

LIST OF PRIOR ART DOCUMENTS

Patent Documents

Patent Document 1: Laid-open Japanese Patent Publication No. 2009-85928
Patent Document 2: Laid-open Japanese Patent Publication No. 2009-133731

SUMMARY OF THE INVENTION

Object to be Accomplished by the Invention

In such circumstances, in order for all IMES transmitters to be capable of sending IMES signals having identical carrier frequencies, it is needed for fundamental oscillation inside the transmitter to have a deviation small with respect to its nominal frequency, to be small in frequency variation and to have low temperature dependency which represents that the fundamental oscillation is free from variations in frequency due to variations in ambient temperature. Generally, oscillators having these characteristic features are strictly managed and controlled in temperature in thermostatic chambers and could be replaced with atomic clocks in which resonance of an atom having some particular frequency is used, resulting in being accompanied by disadvantages of high equipment expenses as well as large size. Furthermore, how expensive the oscillator is, frequency variations are certainly be caused resulting from a long term use. Therefore, there is an undesirable need for regular frequency calibration.

As one of methods of restraining these long term frequency variations, there has been known a method of correcting a long term variation of the oscillator through reception of a GPS signal. However, although the GPS signal can be easily received in the open air environment, there is the problem that the GPS signal cannot be received since it is hardly reachable in an indoor environment such as buildings and underground shopping areas.

As a means of solving this problem, there is what is called a GPS repeater. It is one that draws GPS signals received in the open air into a building through a cable and resends in the building. However, when applying this means to frequency synchronization of navigation signal transmitters installed on the ground, it is needed to introduce a GPS repeater system separately, resulting in additional need of installation of the GPS repeater system and construction costs in consequence. In addition, GPS signals sent from the GPS repeater turn into a major source of interference for users who intends to receive incoming intrinsic GPS signals, albeit only slightly, from outdoors by, for example, a sensitive receiver.

As an alternative means for frequency synchronization of ground navigation signals in an indoor environment, there is one which realizes the frequency synchronization by means of two-way wire transmission or wireless transmission of timing signals between transmitters. However, when applying this means to frequency synchronization of the navigation signal transmitter installed on the ground, it is needed to provide the transmitters with timing signal transmission circuits aside from navigation signals, resulting in disadvantages of an increase in the number of parts of the transmitter and an increase in electric power consumption.

It is the primary object of embodiments of the present invention to at least relieve the conventional technical problems. That is, the present invention relates to a method of inexpensively and certainly reducing a frequency deviation of a terrestrially transmitted navigation signal and it is an object to be accomplished by the present invention to eliminate the use of high-precision and expensive oscillators necessarily built in the conventional transmitters by virtue of providing the navigation signal generating method.

Further, it is the second object of the embodiments of the present invention to time the terrestrially transmitted navigation signals. That is, the present invention relates to a method of bringing a clock timing of the terrestrially transmitted navigation signal with a certain reference and it is an object to be accomplished by the present invention to provide improvement in convenience at the time of signal reception such as shortening of signal acquisition time resulting from a diminished spreading code phase difference among a plurality of terrestrially transmitted navigation signals which are conventionally not at the same points of time, by means of matching timings among the navigation signals absolutely or otherwise relatively and absolutely, by virtue of providing the navigation signal generating method.

In light of the technical objects described above, the inventors have found out that, when IMES signals a and b are identical in carrier frequency and spreading code phase, transmitters are capable of receiving the IMES signals b without searching for a carrier frequency and a spreading code phase thereof by the use of information on a carrier frequency and a spreading code phase determined according to received IMES signals a, so as thereby to be capable of performing smoothly receivable signal switching from the IMES signal a to the IMES signal b.

Means to Accomplish the Object

The navigation signal transmitter according to the present invention is characterized by comprising a receiving section for receiving a transmission wave and generating a synchronization pulse in synchronization with a predetermined data frame; a reference signal synchronizing section for generating an internal clock fundamental oscillation by using a pulse generated in the receiving section as a reference pulse; an IMES signal generating section for generating an IMES signal based on the internal clock fundamental oscillation; and a transmission antenna through which the IMES signal generated in the IMES signal generating section is transmitted, wherein the reference signal synchronizing section comprises a counter circuit, a comparator, a low-pass control filter, a D/A converter, a voltage controlled oscillator, and a frequency dividing circuit, wherein the counter circuit is operable to count the number of clock pulses generated in the voltage controlled oscillator, using a signal input from the transmission wave as a reference signal, and the comparator is operable to compare the counted value with a reference value, and wherein the reference signal synchronizing section is configured to, when a magnitude relationship as a result of the comparison in the comparator falls within a predetermined value and continues a predetermined number of times in one direction, controllably adjust a level of control voltage of the voltage controlled oscillator.

The reference signal synchronizing section is configured to, when the magnitude relationship as a result of the comparison in the comparator exceeds the predetermined value, controllably discard the counted value.

The reference signal synchronizing section is configured to, when the magnitude relationship as a result of the comparison in the comparator exceeds the predetermined value and the value exceeding the predetermined value continues a predetermined number of times within a predetermined time period, controllably change a value as a time constant.

A method of transmitting a navigation signal according to the present invention is characterized by comprising the steps of: receiving by a receiving section a transmission wave and generating a synchronization pulse in synchronization with a predetermined data frame; generating by a reference signal synchronizing section an internal clock fundamental oscillation by using a pulse generated in the receiving section as a reference pulse; generating by an IMES signal generating section an IMES signal based on the internal clock fundamental oscillation; and transmitting by a transmission antenna the IMES signal generated in the IMES signal generating section; wherein the reference signal synchronizing section comprises a counter circuit, a comparator, a low-pass control filter, a D/A converter, a voltage controlled oscillator, and a frequency dividing circuit, and wherein the step of generating an internal clock fundamental oscillation includes: counting by the counter circuit the number of clock pulses generated in the voltage controlled oscillator, using a signal input from the transmission wave as a reference signal, and the comparator is operable to compare the counted value with a reference value, and when a magnitude relationship as a result of the comparison in the comparator falls within a predetermined value and continues a predetermined number of times in one direction, controllably adjusting a level of control voltage of the voltage controlled oscillator.

Effect of the Invention

The navigation signal transmitter and the method of transmitting a navigation signal of the present invention make it possible to reduce a frequency deviation of terrestrially transmitted navigation signals inexpensively and certainly, and to eliminate the use of high-precision and expensive oscillators which are necessarily mounted to conventional transmitters. Furthermore, the navigation signal transmitter and the method of transmitting a navigation signal of the present invention make it possible to provide improvement in convenience at the time of signal reception such as shortening of signal acquisition time resulting from a diminished spreading code phase difference among a plurality of terrestrially transmitted navigation signals by means of matching timings among the navigation signals absolutely or otherwise relatively and absolutely.

DESCRIPTION OF EMBODIMENTS

A navigation signal transmitter and a method of generating a navigation signal according to the present invention will now be described in detail.

Embodiment 1

Figure 1:
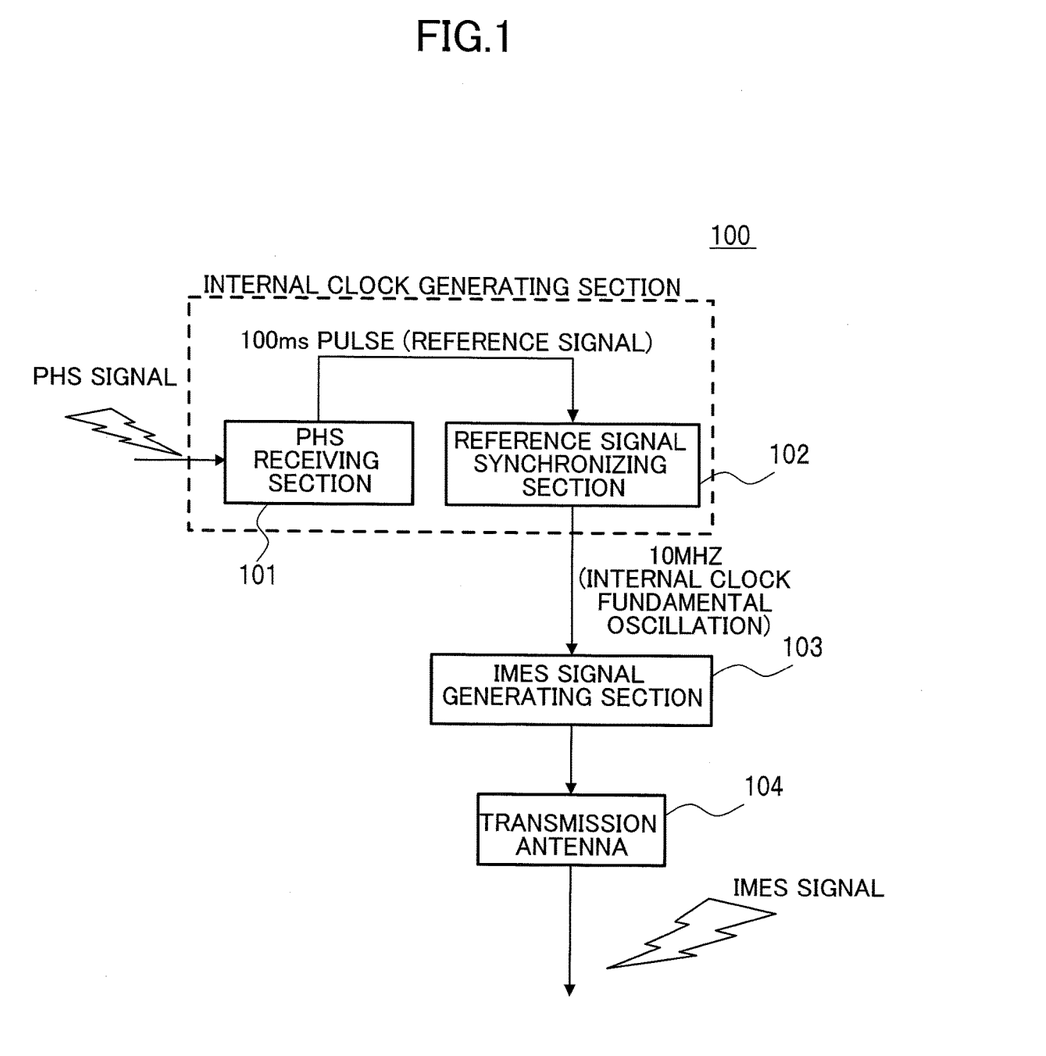
FIG. 1 is an explanatory drawing for illustrating a structure of a navigation signal transmitter according to an embodiment of the present invention.
Figure 2:
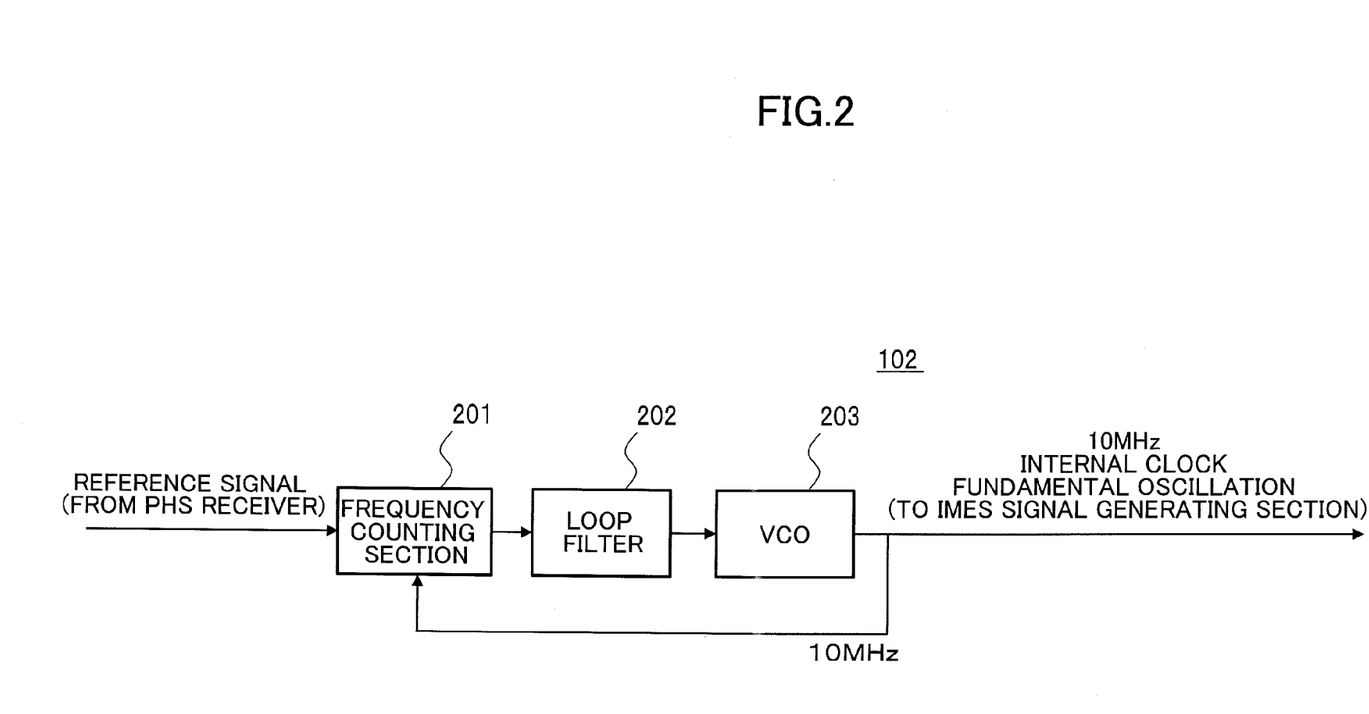
FIG. 2 is an explanatory drawing for illustrating a block configuration of a reference signal synchronizing section in the navigation signal transmitter according to the embodiment of the present invention.

FIG. 1 illustrates a structure of a navigation signal transmitter according to an embodiment of the present invention. Here, it is assumed in this embodiment that a PHS signal shall be "some kind of signal of an external system (transmission wave)". The navigation signal transmitter 100 comprises a PHS receiving section 101, a reference signal synchronizing section 102, an IMES signal generating section 103 and a transmission antenna 104. In addition, the PHS receiving section 101 and the reference signal synchronizing section 102 make up an internal clock generating section (which just corresponds to the internal clock generator 231 illustrated in FIG. 2 of Patent Document 1). However, in conventional internal clock generators such as illustrated in FIG. 2 of Patent Document 1, an expensive OCXO (Oven Controlled Xtal Oscillator, which is also called a "temperature controlled crystal oscillator"), for example, is employed in order to secure a high degree of frequency precision.

In the navigation signal transmitter 100, the PHS receiving section 101 which is a component of the internal clock generator as illustrated in FIG. 1 receives a PHS radio wave of 1.9 GHz band transmitted from a PHS base station and generates 100 ms pulses in synchronization with a PHS data frame. Since a frequency offset of the PHS base station is small and a plurality of PHS base stations are synchronized with each other, the cycle of the PHS data frame satisfies a certain standard even if there is a deviance in the internal clock of the PHS receiving section in the transmitter. That is, a repeating frequency of the PHS data frame has a small frequency offset.

At this point, considering synchronization with some kind of signal of an external system by taking it as a radio wave propagated through the air, techniques are conceivable to synchronize with a carrier frequency of the radio wave propagated through the air or to generate a timing signal in conformity to the carrier wave. However, since the carrier frequency varies according to modulation schemes of the radio wave (the frequency varies dynamically through FM modulation, a frequency hopping scheme in FDMA and CDMA), the present invention is characterized by synchronization with not a carrier wave but rather a data frame cycle.

Then, a pulse of a cycle of 100 ms output from the PHS receiving section 101 in FIG. 1 is input to the reference signal synchronizing section 102 as a reference signal. The reference signal synchronizing section 102 generates an internal clock fundamental oscillation in frequency synchronization with the reference signal, and outputs it to the IMES signal generating section 103. It is also possible to output it to a MUX 232 as illustrated in FIG. 2 of Patent Document 1 in place of the IMES signal generating section 103.

Then, the IMES signal generating section 103 in FIG. 1 generates an IMES signal disclosed in Patent Documents 1 and 2 and then transmits the signal through the transmission antenna 104.

Here, it should be noted that the signal output by the PHS receiving section 101 and input as a reference signal to the reference signal synchronizing section 102 is in synchronization with the PHS radio wave propagated through the air.

The PHS receiving section 101 may be a receiving section capable of receiving a signal other than the PHS signal (for example GSMs, LTEs or commercial power sources). Even employing a signal other than the PHS signal, it is possible to employ a configuration described in the next paragraphs or after for details of signal processing. Hereinafter, description will be made assuming that the signal received in the receiving section 101 is a PHS signal.

FIG. 2 shows a block diagram illustrating a detailed structure of the reference signal synchronizing section 102. The reference signal synchronizing section 102 comprises a frequency counting section 201, a loop counter 202 and a VCO (Voltage Controlled Oscillator) 203, where a reference signal input from the PHS receiving section 101 is eventually output to the IMES signal generating section 103 as an internal clock fundamental oscillation of 10 MHz.

Figure 3:
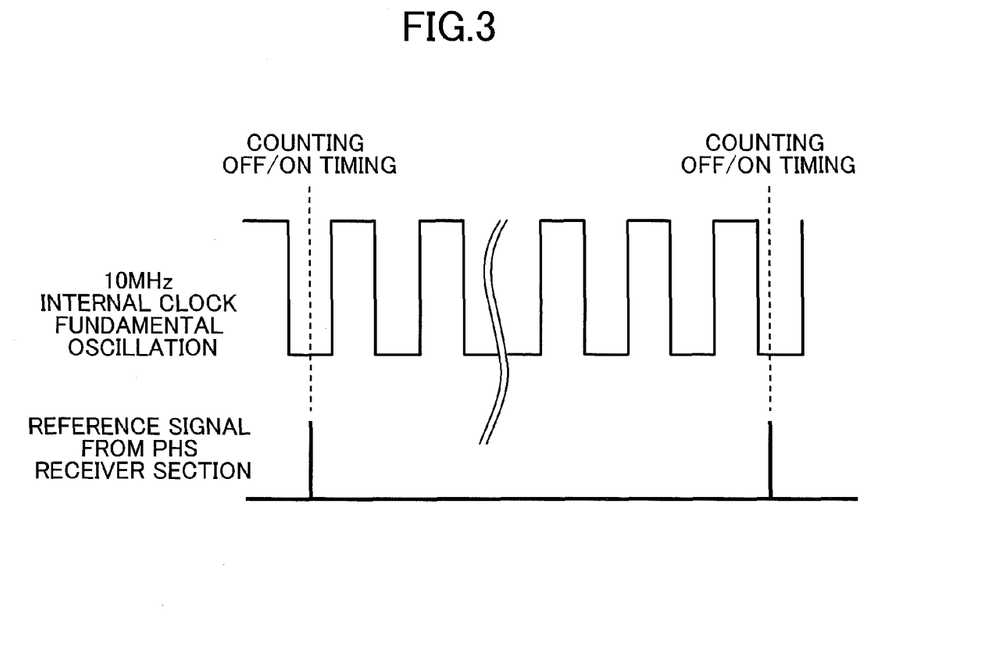
FIG. 3 is an explanatory drawing for illustrating operation of a frequency counting section in the reference signal synchronizing section of the navigation signal transmitter according to the embodiment of the present invention.

Next, operation of the frequency counting section 201 in the reference signal synchronizing section 102 is shown in FIG. 3. In the frequency counting section 201, the signal input from the PHS receiving section 101 is used as a reference signal for the reference signal synchronizing section 102, by which signal it is triggered to count the number of clock pulses generated by the VCO 203 in the reference signal synchronizing section 102 using a counter circuit (not shown), as illustrated in FIG. 3. The measured count value of clock pulses is compared with the number of pulses determined based on a nominal frequency of the VCO 203 and a nominal pulse cycle value of the reference signal in a comparison circuit (not shown), and a value of difference between the numbers of pulses is subjected to smoothing in the loop filter 202, transformed into a DC voltage by setting an appropriate gain and conducting a D/A conversion, and then input into the VOC 203. This DC voltage is proportional to a frequency difference between the reference signal and the internal clock fundamental oscillation, and the VCO 203 adjusts its own frequency according to the voltage so as thereby to hold the frequency difference between the reference signal and the internal clock fundamental oscillation constant.

At this point, the number of pulses determined based on the nominal frequency of the VCO 203 and the nominal pulse cycle value of the reference signal amounts to:

$$10*10^6*0.1=1000000 \text{ [pulses]}.$$

in the case where the nominal frequency of the VCO 203 is 10 MHz and the nominal pulse cycle value of the reference signal is 100 ms.

[Effects of the Navigation Signal Transmitter and Others of the Present Invention]

Figure 4:
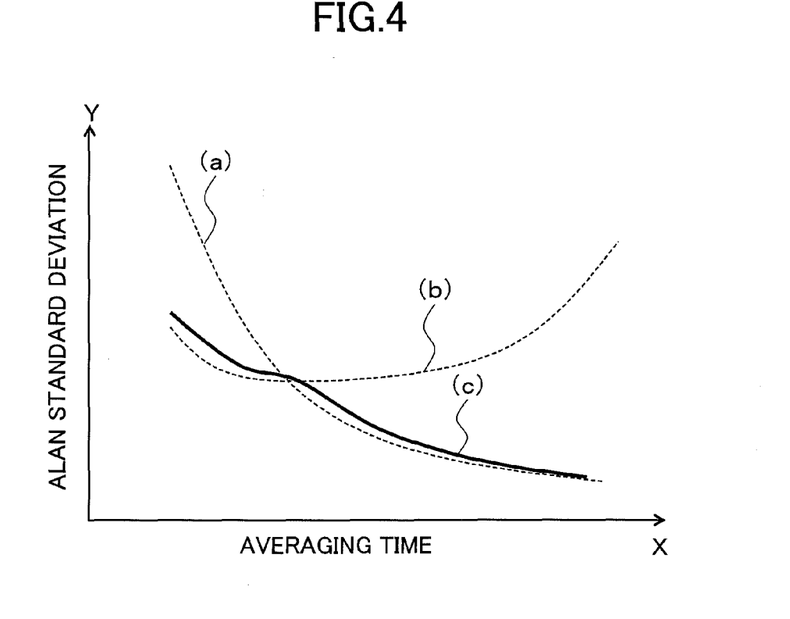
FIG. 4 is an explanatory chart for illustrating the degree of frequency stability (Allan Standard Deviation) of each signal in the reference signal synchronizing section of the navigation signal transmitter according to the embodiment of the present invention.

FIG. 4 illustrates an explanatory chart for providing an explanation of stability of the reference signal and the internal clock fundamental oscillation generated in association with the operation of the reference signal synchronizing section 102. In the first instance in FIG. 4, (a) is a typical example of the degree of frequency stability (Alan standard deviation) of a reference signal of the reference signal synchronizing section 102, i.e. an output signal from the PHS receiving section; (b) is an example of the degree of frequency stability of only the VCO incorporated in the reference signal synchronizing section. It can be seen from the characteristic (a) that the reference signal is excellent in long-term frequency stability, but is devoid of short-term frequency stability. It can be seen from the characteristic (b) that the VCO is devoid of long-range frequency stability, but is excellent in short-range frequency stability.

Then, the characteristic (c) indicates frequency stability of a clock signal output from the reference signal synchronizing section 102 of the navigation signal transmitter (and others) according to the present invention. According to the characteristic (c), the clock signal is comparable with the reference signal (i.e. the PHS radio wave) in long-term stability and has short-term frequency stability on a level with VOC. Thus, it can be seen that the clock signal demonstrates consistent performance in a wide range of frequency over long and short terms.

Embodiment 2

Figure 5A:
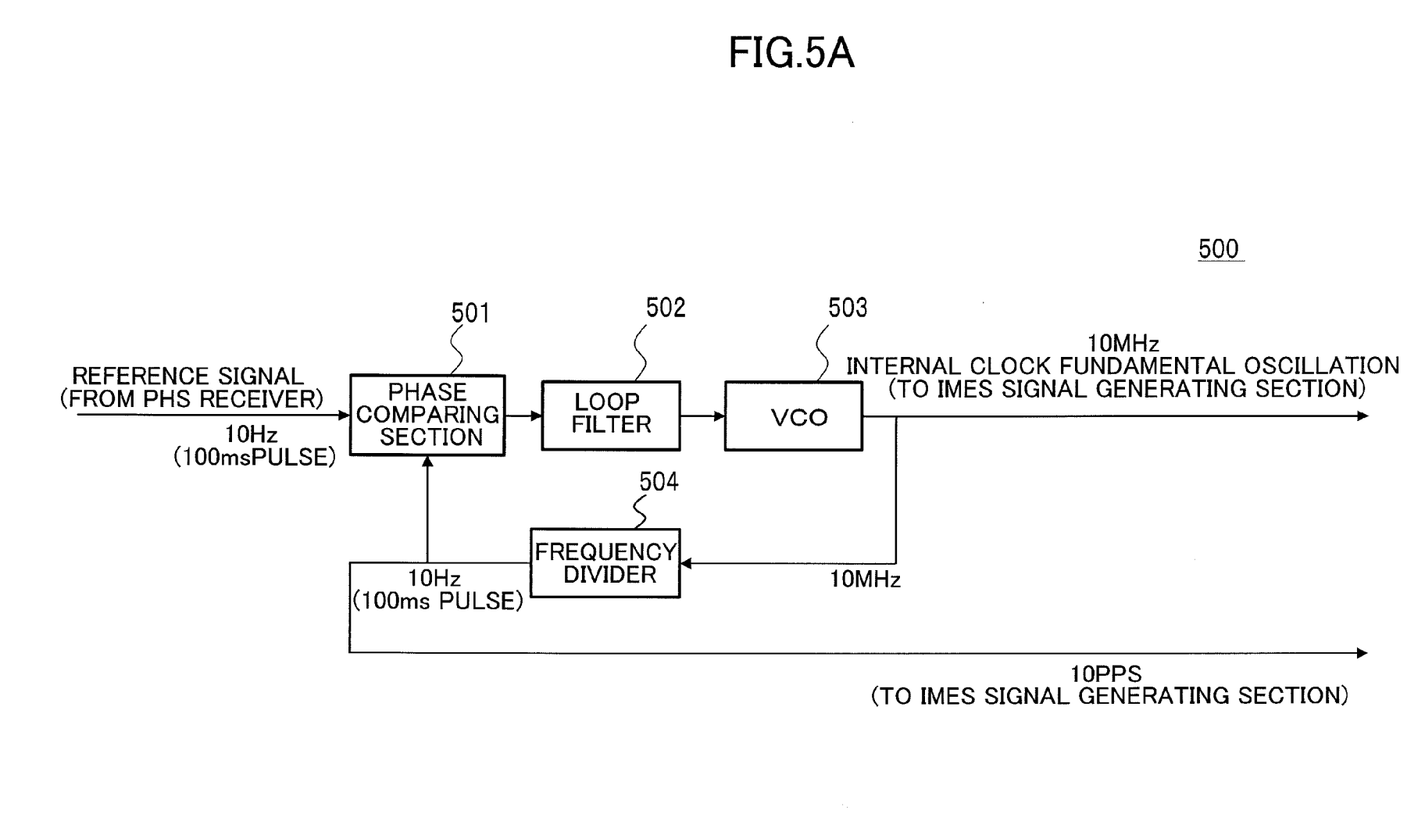
FIG. 5A is an explanatory drawing for illustrating a reference signal synchronizing section for making time synchronization in a navigation signal transmitter according to another embodiment of the present invention.

FIG. 5A illustrates, as a second embodiment of the present invention, a structure of the reference signal synchronizing section for making time synchronization in the navigation signal transmitter. A reference signal synchronizing unit 500 comprises a phase comparing section 501, a loop filter 502, a VCO (Voltage Controlled Oscillator) 503 and a frequency divider 504.

In the phase comparing section 501, a phase difference is measured by using a signal output from the PHS receiving section as a reference signal of the reference signal synchronizing unit to perform a phase comparison with a signal generated by the frequency divider 504 in a PLL section.

The measured phase difference is subjected to smoothing in the loop filter 502, converted to a direct current voltage through D/C conversion with an appropriate gain setting, and input to VOC 503. This direct current voltage is proportional to the phase difference between the reference and frequency divided signals, so that VCO 503 keeps the phase difference constant by adjusting its own frequency according to the voltage.

Figure 7:
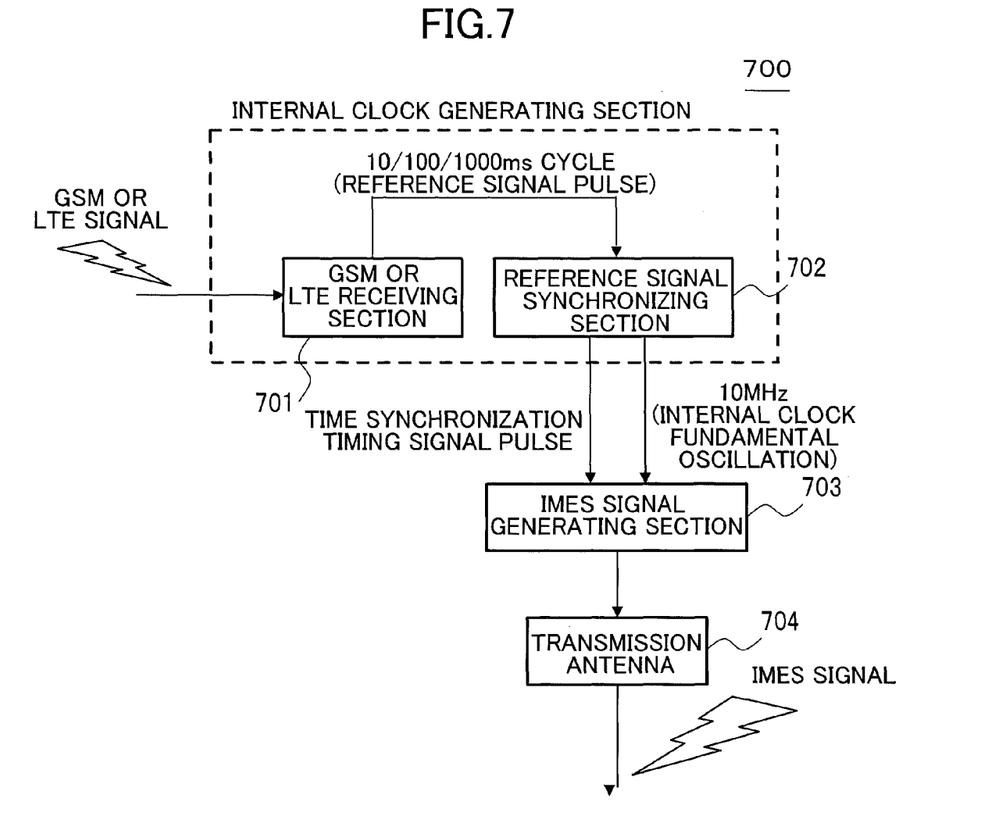
FIG. 7 is an explanatory drawing for illustrating a structure of a navigation signal transmitter according to another embodiment of the present invention.

In this embodiment, the reference signal synchronizing section outputs, in addition to the internal clock fundamental oscillation, a time synchronization timing signal pulse having a pulse cycle of an integral multiple of 1 ms (which may be 10 ms 100 ms or 1000 ms as an example and is different from a reference signal pulse in FIG. 7) in order to control the timing of PRN code (this time synchronization timing signal pulses are channeled from 702 to 703 in FIG. 7 described below).

Figure 6:
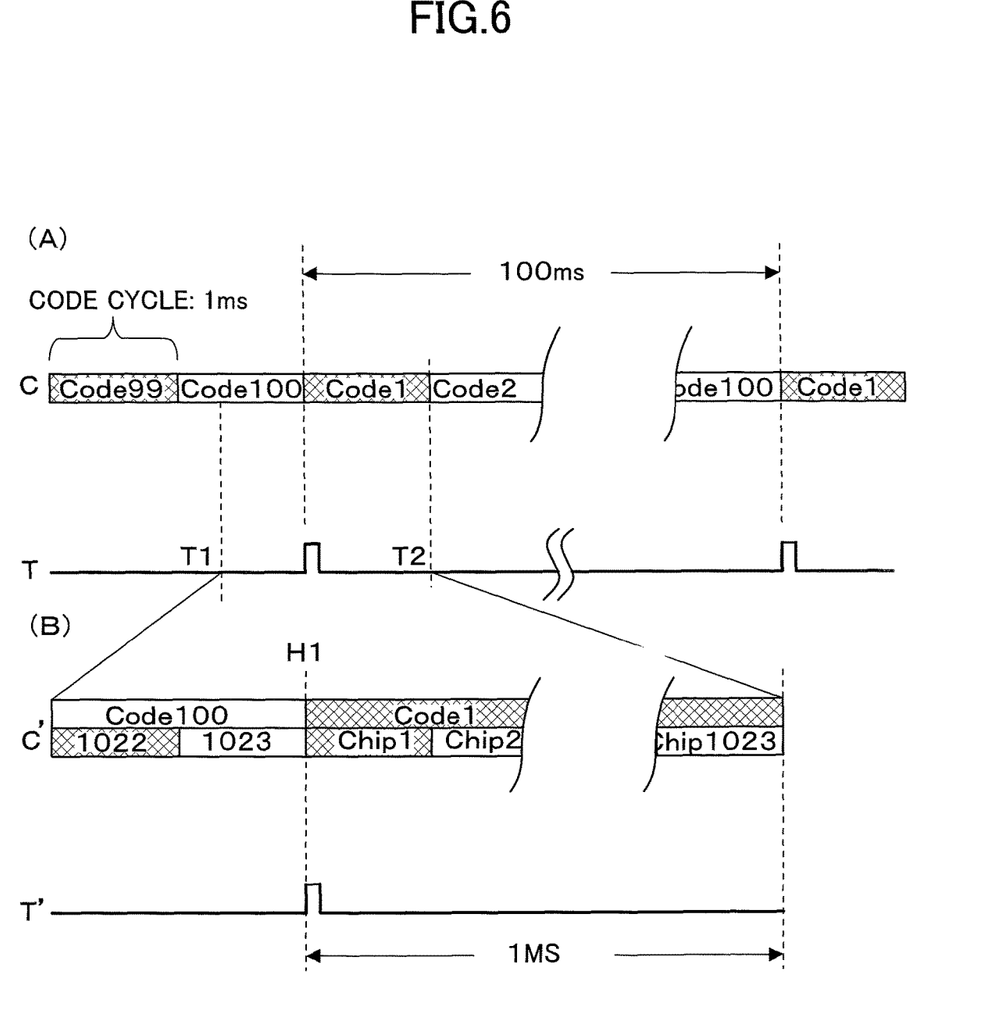
FIG. 6 is an explanatory drawing for illustrating a relationship between a clock timing signal and a spreading code in the navigation signal transmitter according to another embodiment of the present invention.

An example of the timing control of PRN code is illustrated in FIG. 6. FIG. 6(A) is expressive of a spreading code C of 1 ms cycle which is generated in the IMES signal generating section and to which a time synchronization timing signal T is synchronized. FIG. 6(B) is an enlarged view of an interval T1-T2 in FIG. 6(A), in which the clock timing is synchronized with the PHS radio wave by broadcasting the spreading code C' having a bit (chip) number of 1023 bits (1023 chips) while controlling a leading end thereof (at the timing when Code 1 and Chip 1 are coincide with each other) to be in synchronization with a pulse of the time synchronization timing signal T'.

Embodiment 3

FIG. 7 illustrates, as a third embodiment of the present invention, a structure for which a radio wave of a mobile phone such as GSM and LTE is employed as some kind of signal of an external system. A navigation system signal transmitter 700 comprises a GSM or an LTE receiving section (designated generically as a receiving section 701) for receiving a GSM signal or an LTE signal, a reference signal synchronizing section 702, an IMES signal generating section 703 and a transmission antenna 704. That is, in this embodiment, the GSM or the LTE receiving section 701 is employed in place of the PHS receiving section 101 to input pulses of 10 ms, 100 ms or 1000 ms as a reference signal to the reference signal synchronizing section 702. It is only necessary in a modification of the reference signal synchronizing section 702 to change the value to be compared with the number of pulses counted by a frequency counter (not shown in FIG. 7) to 10 ms, 100 ms or 1000 ms without requiring any structural change other than the GSM or the LTE receiving section 701. This makes it possible to conveniently utilize radio waves other than PHS such as GSM or LTE.

At this point, the cycles of the reference signal pulse (10 ms, 100 ms, 1000 ms) are separately used according to environment of communication infrastructure. For example, only a reference signal of 100 ms is available for a PHS and a reference signal of 10 ms for a CDMA.

Embodiment 4

As a fourth embodiment of the present invention, a commercial power supply may be employed as some kind of signal of an external system. In this embodiment, a commercial power supply receiving section is employed in place of the receiving section 701 to input pulses of 10 ms, 100 ms or 1000 ms obtained from the power-frequency (50/60 Hz in Japan) as the reference signal to the reference signal synchronizing section 702. In the case of commercial power supply, the same power supply is used in one building, for example. Thus, IMES transmitters in the same building will have the same relative frequency even in the case of poor absolute precision. This makes it possible for the IMES transmitters to be in frequency synchronization even in a place where the radio waves such as PHS, GSM and LTE are not reachable.

Embodiment 5

Figure 5B:
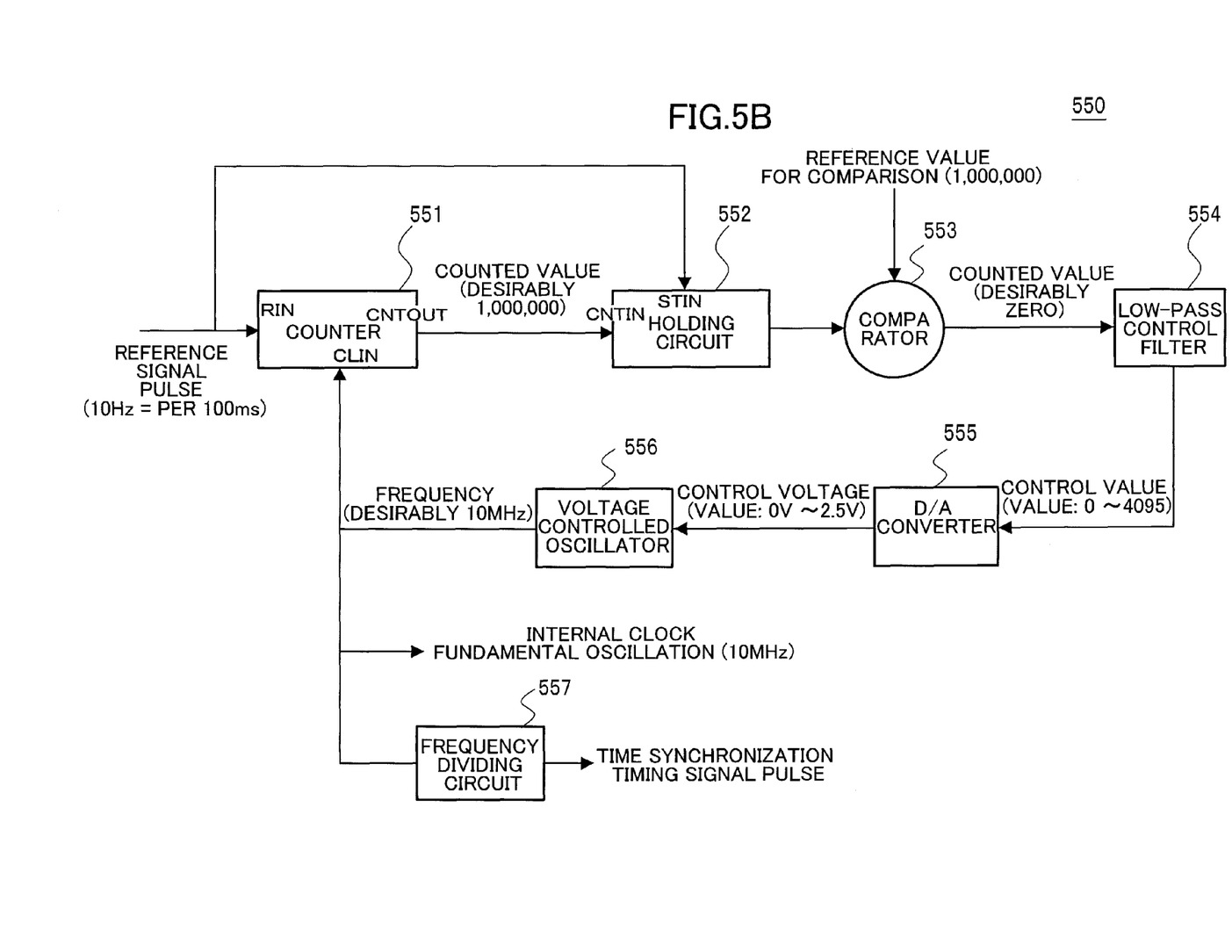
FIG. 5B is an explanatory drawing for illustrating a reference signal synchronizing section for making time synchronization of a navigation signal transmitter according to another embodiment of the present invention.

As a fifth embodiment of the present invention, FIG. 5B illustrates a structure of a reference signal synchronizing section for making time synchronization in the navigation signal transmitter. The reference signal synchronizing section 550 comprises a counter circuit 551, a holding circuit 552, a comparator 553, a low-pass control filter 554, a D/A converter 555, a voltage controlled oscillator 556 and a frequency dividing circuit 557.

The counter 551 counts the number of clock pulses (typically of 10 MHz) transmitted from the voltage controlled type oscillator (VCXO) 556 and transmits the counted value to the holding circuit 552 every 100 ms at which a reference pulse is provided. Further, the counted value is compared with a reference value for comparison in the comparator 553 (typically 1,000,000 times), and as a first filtering, when the counted value of the VCXO pulses deviate beyond ±10% from the reference value, it is ignored as an outlier (outlier elimination).

Then, as a second filtering, when a magnitude relationship as a result of the comparison continues n times in either of a larger side (+ direction) or a smaller side (− direction), the level of voltage control is controllably changed by one. That is, when the measurement in + direction continues n times, the control voltage level is decremented by one (−1) with respect to a current level, and when the measurement in − direction continues n times, the control voltage level is incremented by one (+1) with respect to a current level. At this point, the amount of voltage control for one level is 2.5(V)/4096(V) when control is performed at a resolution of 120 bits.

Further, a synchronization timing signal pulse is output from the frequency dividing circuit 557.

In FIG. 5B, RIN denotes a reset input, CLIN denotes a clock input, CNTOUT denotes a counted value output, CNTIN denotes a counted value input and STIN denotes a set timing input.

In this way, the comparator 553 and the low-pass control filter 554 have a structure for which a so-called random walk filter is applied in FIG. 5B. Alternatively, the present invention is characterized by adjustment of said n (filter time constant), where a larger n value results in a prolonged period of time until convergence, but trials have demonstrated that when using a PHS signal as the reference signal pulse, excellent results are obtained by setting the n to around 10. Further, it is desirable to set the n to around 2 when using a CDMA signal as the reference signal pulse.

At this point, since the reference signal pulse is generated on a cycle of 100 ms, a voltage control adjustment is conducted at a rate of once per second when n is 10, and once per 0.2 seconds when n is 2

Generally, when using a PHS signal as the reference signal pulse, the navigation signal transmitter will approximately be synchronized in frequency with the reference signal pulse in about 15 to 30 minutes after installation thereof. However, in the event of abrupt increase in temperature of the navigation signal transmitter, for example, due to an occurrence of fire, the exact operation of the transmitter may not be promising. In such the case, the synchronization with the reference signal pulse in frequency is lost, so that it is necessary to quickly retry the timing synchronization. Accordingly, to detect emergencies such as an abrupt increase in temperature such as the case of a fire, it may be possible to install a separate temperature sensor. However, since this installation requires additional circuits and extra costs, it is also possible to configure to make a decision for emergency by detecting an abnormal counted value. Specifically, when ±10% or more of deviation of the VCXO value continues a predetermined number of times (for example, 100 or 150 times) within a predetermined period of time (for example, for 20 or 30 seconds), it is determined that the temperature is abnormal (an emergency such as a fire occurs).

Figure 5C:
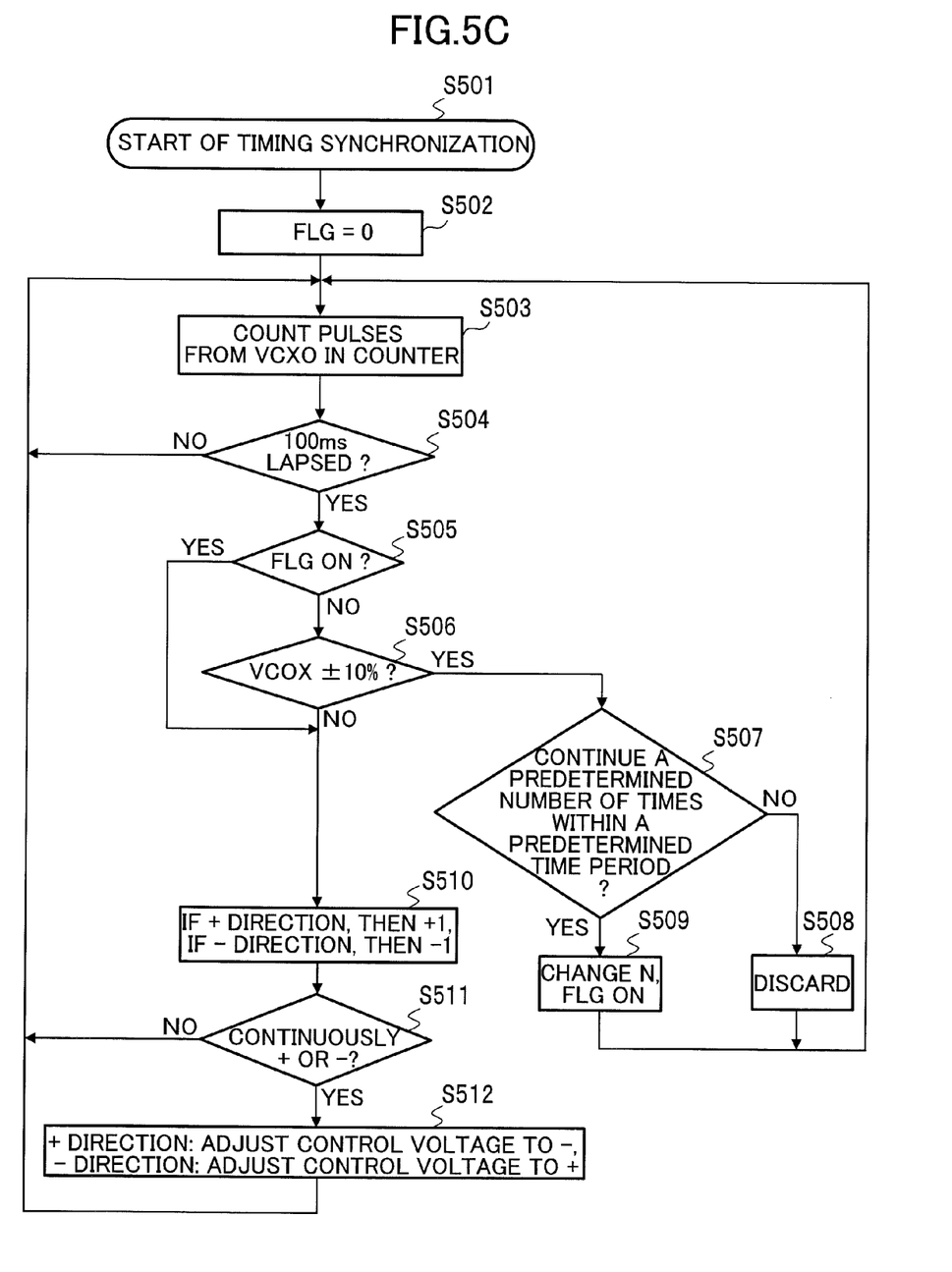
FIG. 5C is a flowchart for illustrating an operation flow in the reference signal synchronizing section for making time synchronization of the navigation signal transmitter according to a still another embodiment of the present invention.

A detailed flow of this case is illustrated in FIG. 5C. When a timing synchronization is started in step S501, the process flows to step S502 where a flag for checking whether any emergency such as an abrupt increase in temperature due to a fire is occurring (hereinafter referred to as an emergency flag) is initialized.

Then, the process flows to step S503 where pulses emitted from the VCOX are counted in the counter. In step S504, a time is measured based on the PHS fundamental oscillation to determine whether 100 ms has lapsed. When 100 ms has not yet lapsed (No in step S504), the process returns to step S503, and when 100 ms has lapsed, the process flows to step S505 to check whether the emergency flag is On. In step S505, when the emergency flag is On, the process flows to step S510, while when the emergency flag is Off, the process flows but to step S506.

In step S506, determination is made as to whether the VCXO value is within ±10%. When the VCXO value is within ±10%, it is determined to be a normal variation and a control voltage adjustment is performed (to step S510), while when it exceeds ±10%, determination is made as to whether the value is an error to be eliminated (outlier) or an emergency (step S507). In step S507, it is determined whether the VCXO value exceeds ±10% and this continues a predetermined number of times within a predetermined time period. As an example, it is determined whether it continues 100 times within 20 seconds or 150 times within 30 seconds. If it continues a predetermined number of times within a predetermined period of time (Yes), the process flows to step S509 where it is determined that ambient temperature is abruptly increasing around the location where the navigation signal transmitter is installed due to an emergency such as a fire, and the time constant n is changed to a value smaller than a currently set value (for example from n=10 to n=2). Then, the emergency flag is turned On.

In step S507, when the VCXO value exceeding ±10% does not continue a predetermined number of times within a predetermined period of time, this value is discarded as an outlier.

In step S510, when the count of pulses emitted from VCXO is deviated to the plus (+) direction, it is counted as +1, and when it is deviated to the minus (−) direction, it is counted as −1. Then the process flows to step S511.

In step S511, it is determined whether the value counted in S510 (+ or −) continues n times, where when it continues n times (Yes), the process flows to step S512, and when it does not continue n times (No), the process returns to step S502.

In step S512, when the value continues n times in plus (+) direction, the control voltage is adjusted to a minus (−) direction, and when the value continues n times in minus (−) direction, the control voltage is adjusted to a plus (+) direction. Then, the process returns to step S503.

In the flow illustrated in FIG. 5C, it is determined in step S507 whether the VCXO value exceeds ±10% and this continues a predetermined number of times within a predetermined time period. Alternatively, not only when the VCXO value continuously exceeds ±10% within a predetermined time period but also when the number of times for the VCXO value exceeding ±10% cumulatively reaches a certain number of times, the process may flow to step S509 to controllably turn the emergency flag On and change the time constant n to a value smaller than the currently set value. In this case, when the number of times for the VCXO value exceeding ±10% cumulatively reaches 1000 times within three minutes, or when the number of times for the VCXO value exceeding ±10% cumulatively reaches 1000 times within five minutes, the process flows to step S509.

The flow of determining whether the VCXO value exceeding ±10% continues a predetermined number of times within a predetermined time period has an advantage that it can detect damages, for example, due to a fire in a quite short period of time. On the other hand, the flow of determining whether the number of times for the VCXO value exceeding ±10% cumulatively reaches a certain number of times within a predetermined time period has an advantage that it can detect damages, for example, due to a fire in certain degree of short period of time while preventing malfunctions from occurring.

While descriptions for the process of turning the emergency flag off are omitted in the flow illustrated in FIG. 5C, various process are conceivable according to embodiments. For example, the emergency flag may be turned off after a predetermined time period has passed, it may be turned off manually, and so forth.

Alternatively, it is also possible to controllably turn the emergency flag off when the VCXO value continuously falls within ±10% a predetermined number of times within a predetermined time period or when the number of times for the VCXO value falling within ±10% cumulatively reaches a certain number of times within a predetermined time period.

It goes without saying that it is also possible to implement a simple control of timing synchronization without implementing the emergency detection logic (steps S502, S505 and S509 etc.) described above.

As stated above, the navigation signal transmitter of the present invention focuses attention on signal receiving operation in the receiver which receives high-precision clock-based signals such as GPS, as well as on the problem with navigation signals for use in the terrestrial receivers for improving convenience of the receivers, and provides inexpensive means and method for implementing a transmitter which fulfils a condition of frequency offset requirement of about 0.02 ppm to overcome such a problem.

The GPS is based on a high-precision clock. Thus, according to a natural idea of those skilled in the art, it is likely to be recognized that the high-precision clock is also necessary for generation of ground-based navigation signals as well as GPS signals. However, what is needed in the ground-based navigation signal transmitter is not the absolute frequency precision but rather relative frequency precision between each transmitter. Thus, it is more important that each transmitter uses a common frequency standard than that the frequency standard used is of high-precision. On the other hand, it is desirable that the navigation signal transmitter for practicing the above requirement requires small number of functions and modules to be newly added. Therefore, the effect is provided that a structural scale of an entire system including the navigation signal transmitter according to the present invention can be downsized by using a type of frequency standard for the ground-based navigation signal transmitter available indoors, having an coverage area broader than that of the navigation signal transmitters, enabling a plurality of navigation signal transmitters to come into service and being an existing frequency standard, even if it does not have a nature of being available as a common frequency standard.

It should be noted that all technical elements, methods and process steps described in Claims, Descriptions, Abstract and Drawings, when combined, serve as structural elements or structural stages of the transmitter and the method of the present invention, excepting combinations in which at least a part of these elements and/or steps are mutually exclusive.

Further, the present invention is not limited to any individual and specific detailed description of the embodiments described above. In addition, the technical scope of the present invention should be determined in its extension not only by the above description but the scope of Claims and any permutations and modifications equivalent to the Claims fall within the technical scope of the present invention.

EXPLANATION OF CODES 100, 500: Navigation Signal Transmitter
101: PHS Receiving Section
102, 702: Reference Signal synchronizing section
103, 703: IMES Signal generating section
104, 704: Transmission Antenna
201: Frequency Counting Section
202, 502: Loop Filter
203, 503: VOC (Voltage Controlled Oscillator)
501: Phase Comparing Section
504: Frequency Divider
551: Counter
552: Holding Circuit
553: Comparator
554: Low-pass Control Filter
555: D/A Converter
556: Voltage Controlled Oscillator
557: Frequency Dividing Circuit
701: GSM or LTE Receiving Section

What is claimed is:

1. A navigation signal transmitter comprising:
  a receiving section for receiving a transmission wave and generating a synchronization pulse in synchronization with a predetermined data frame;
  a reference signal synchronizing section for generating an internal clock fundamental oscillation by using a pulse generated in the receiving section as a reference pulse;
  an Indoor Messaging System (IMES) signal generating section for generating an IMES signal based on the internal clock fundamental oscillation; and
  a transmission antenna through which the IMES signal generated in the IMES signal generating section is transmitted,
  wherein the reference signal synchronizing section comprises a counter circuit, a comparator, a low-pass control filter, a D/A converter, a voltage controlled oscillator, and a frequency dividing circuit,
  wherein the counter circuit is operable to count the number of clock pulses generated in the voltage controlled oscillator, using the synchronization pulse, in synchronization with the predetermined data frame as a reference pulse signal, and the comparator is operable to compare the counted value with a reference value, and
  wherein the reference signal synchronizing section is configured to, when a magnitude relationship as a result of the comparison in the comparator falls within a predetermined value and continues a predetermined number of times in one direction, controllably adjust a level of control voltage of the voltage controlled oscillator.

2. The navigation signal transmitter as defined in claim 1, wherein when the magnitude relationship as a result of the comparison in the comparator exceeds the predetermined value, the counted value is controllably discarded.

3. The navigation signal transmitter as defined in claim 2, wherein when the magnitude relationship as a result of the comparison in the comparator exceeds the predetermined value and the value exceeding the predetermined value continues a predetermined number of times within a predetermined time period, a value as a time constant is controllably changed.

4. The navigation signal transmitter as defined in claim 1, wherein
  the transmission wave is a PHS radio wave in 1.9 GHz band transmitted from a PHS base station;
  the data frame is a PHS data frame; and
  the synchronizing pulse is a pulse having a cycle of 100 ms.

5. The navigation signal transmitter as defined in claim 1, wherein the transmission wave is an FM broadcast wave.

6. The navigation signal transmitter as defined in claim 1, wherein the transmission wave is a terrestrial digital broadcast wave.

7. A method of transmitting a navigation signal comprising the steps of:
  receiving by a receiving section a transmission wave and generating a synchronization pulse in synchronization with a predetermined data frame;
  generating by a reference signal synchronizing section an internal clock fundamental oscillation by using a pulse generated in the receiving section as a reference pulse;
  generating by an Indoor Messaging (IMES) signal generating section an IMES signal based on the internal clock fundamental oscillation; and
  transmitting by a transmission antenna the IMES signal generated in the IMES signal generating section;
  wherein the reference signal synchronizing section comprises a counter circuit, a comparator, a low-pass control filter, a D/A converter, a voltage controlled oscillator, and a frequency dividing circuit, and
  wherein the step of generating an internal clock fundamental oscillation includes: counting by the counter circuit the number of clock pulses generated in the voltage controlled oscillator, using the synchronization pulse in synchronization with the predetermined data frame as a reference signal, and the comparator is operable to compare the counted value with a reference value, and when a magnitude relationship as a result of the comparison in the comparator falls within a predetermined value and continues a predetermined number of times in one direction, controllably adjusting a level of control voltage of the voltage controlled oscillator.

8. The method as defined in claim 7, wherein when the magnitude relationship as a result of the comparison in the comparator exceeds the predetermined value, the counted value is controllably discarded.

9. The method as defined in claim 8, wherein when the magnitude relationship as a result of the comparison in the comparator exceeds the predetermined value and the value exceeding the predetermined value continues a predetermined number of times within a predetermined time period, a value as a time constant is controllably changed.

10. The navigation signal transmitter as defined in claim 1, wherein
- the transmission wave is a Global System for Mobile communication (GSM) or Long Term Evolution (LTE) wave transmitted from a GSM or LTE base station;
- the data frame is a GSM or LTE data frame; and
- the synchronizing pulse is a pulse having a cycle of 10/100/1000 ms.

11. The navigation signal transmitter as defined in claim 2, wherein
- the transmission wave is a Global System for Mobile communication (GSM) or Long Term Evolution (LTE) wave transmitted from a GSM or LTE base station;
- the data frame is a GSM or LTE data frame; and
- the synchronizing pulse is a pulse having a cycle of 10/100/1000 ms.

12. The navigation signal transmitter as defined in claim 3, wherein
- the transmission wave is a Global System for Mobile communication (GSM) or Long Term Evolution (LTE) wave transmitted from a GSM or LTE base station;
- the data frame is a GSM or LTE data frame; and
- the synchronizing pulse is a pulse having a cycle of 10/100/1000 ms.

13. The navigation signal transmitter as defined in claim 2, wherein
- the transmission wave is a Personal Handy-phone System (PHS) radio wave in 1.9 GHz band transmitted from a PHS base station;
- the data frame is a PHS data frame; and
- the synchronizing pulse is a pulse having a cycle of 100 ms.

14. The navigation signal transmitter as defined in claim 3, wherein
- the transmission wave is a Personal Handy-phone System (PHS) radio wave in 1.9 GHz band transmitted from a PHS base station;
- the data frame is a PHS data frame; and
- the synchronizing pulse is a pulse having a cycle of 100 ms.

15. The navigation signal transmitter as defined in claim 10, wherein
- the transmission wave is a Personal Handy-phone System (PHS) radio wave in 1.9 GHz band transmitted from a PHS base station;
- the data frame is a PHS data frame; and
- the synchronizing pulse is a pulse having a cycle of 100 ms.

16. The navigation signal transmitter as defined in claim 2, wherein the transmission wave is an FM broadcast wave.

17. The navigation signal transmitter as defined in claim 3, wherein the transmission wave is an FM broadcast wave.

18. The navigation signal transmitter as defined claim 2 wherein the transmission wave is a terrestrial digital broadcast wave.

19. The navigation signal transmitter as defined in claim 3 wherein the transmission wave is a terrestrial digital broadcast wave.

* * * * *